United States Patent [19]
Phillips et al.

[11] Patent Number: 5,749,593
[45] Date of Patent: May 12, 1998

[54] CONVERTER DOLLY LIFT MECHANISM

[76] Inventors: Dennis Earl Phillips, 7660 State Rte. 100 East, Jacks Creek, Tenn. 38347; Dennis Nathan Wright, 381 Kitchen Dr., Henderson, Tenn. 38340

[21] Appl. No.: 620,977

[22] Filed: Mar. 25, 1996

[51] Int. Cl.$^6$ .............................. B60D 1/00; B62D 53/08
[52] U.S. Cl. .............................. 280/476.1; 280/405.1; 280/411.1; 280/425.1
[58] Field of Search .............................. 280/476.1, 402, 280/408, 407, 407.1, 490.1, 405.1, 411.1, 425.1, 438.1; 414/563, 333, 471, 560

[56] References Cited

U.S. PATENT DOCUMENTS

| | | | |
|---|---|---|---|
| 2,733,931 | 2/1956 | Reid et al. | 280/476.1 |
| 3,161,418 | 12/1964 | Brennan et al. | 280/405.1 |
| 3,169,012 | 2/1965 | Fagan | 280/476.1 |
| 3,912,293 | 10/1975 | Harbers | 280/405.1 |
| 4,152,006 | 5/1979 | Dunlap | 1/14 |
| 4,475,612 | 10/1984 | Anderson | 280/405.1 |
| 4,563,018 | 1/1986 | Stage et al. | 3/6 |
| 4,759,563 | 7/1988 | Nash | 280/476.1 |
| 4,826,195 | 5/1989 | Boyles et al. | 3/6 |
| 5,013,209 | 5/1991 | DeMichele et al. | 3/12 |
| 5,090,720 | 2/1992 | Heider et al. | 280/476.1 |
| 5,139,102 | 8/1992 | Pocapalia | 51/4 |
| 5,284,356 | 2/1994 | Heider et al. | 280/476.1 |
| 5,338,050 | 8/1994 | Haire et al. | 280/476.1 |
| 5,363,924 | 11/1994 | Foley et al. | 280/405.1 |
| 5,407,221 | 4/1995 | Haire et al. | 280/476.1 |

*Primary Examiner*—Douglas C. Butler
*Attorney, Agent, or Firm*—Walker, McKenzie & Walker, P.C.

[57] ABSTRACT

A lift mechanism for use with a tractor and a convertor dolly. The lift mechanism includes an elongated arm having a first end and a second end; tractor attachment structure for pivotally attaching the first end of the arm to a tractor; convertor dolly attachment structure for attaching the second end of the arm to a convertor dolly; and actuating structure for raising the second end of the arm.

1 Claim, 2 Drawing Sheets

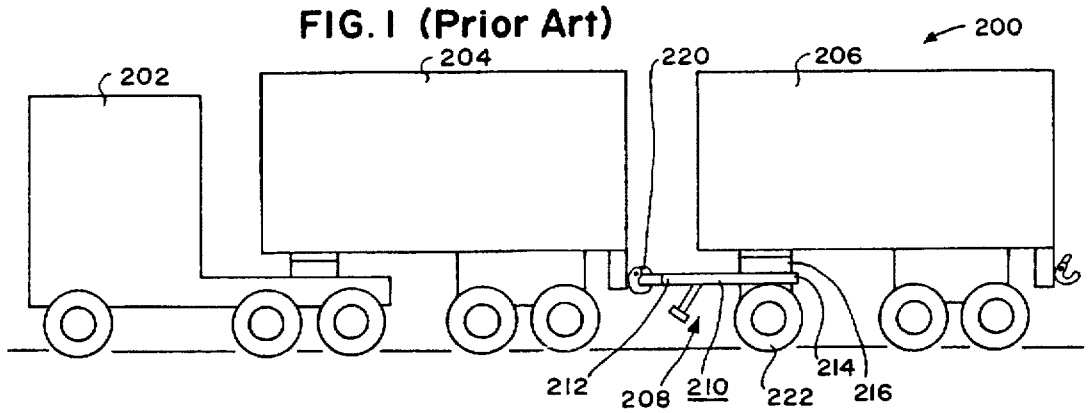
FIG. 1 (Prior Art)
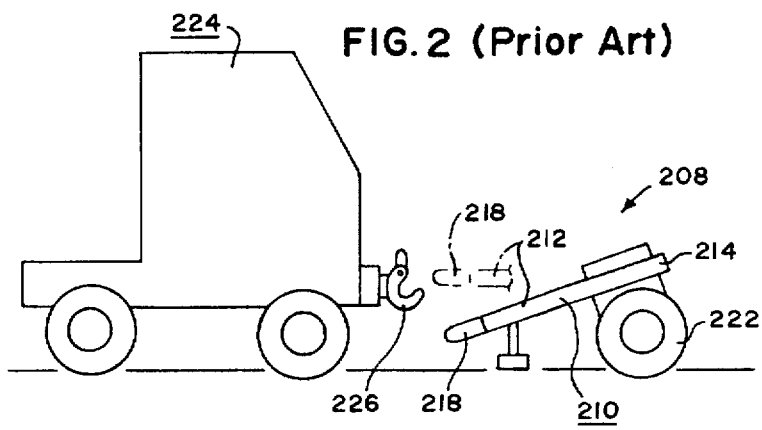
FIG. 2 (Prior Art)
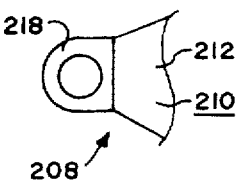
FIG. 3 (Prior Art)
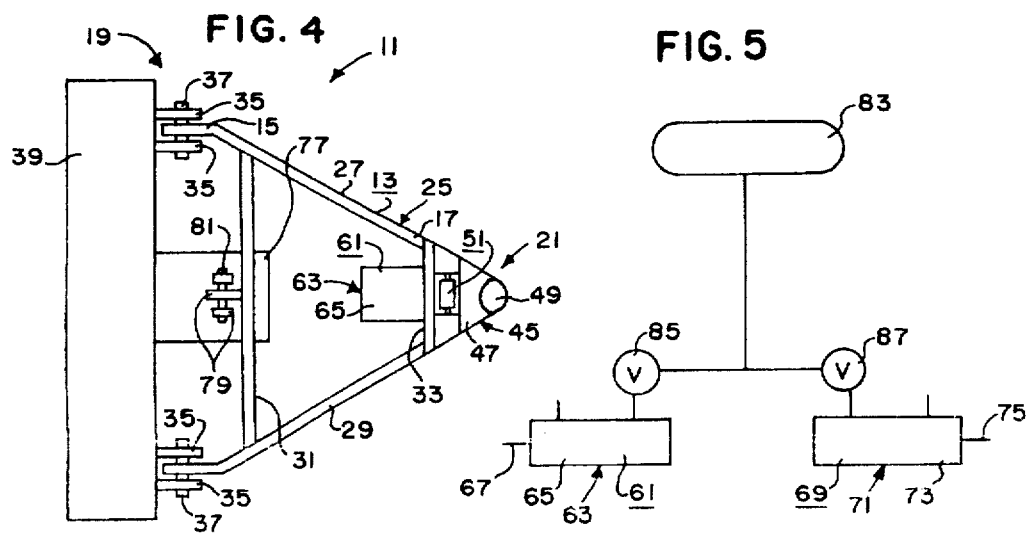
FIG. 4
FIG. 5

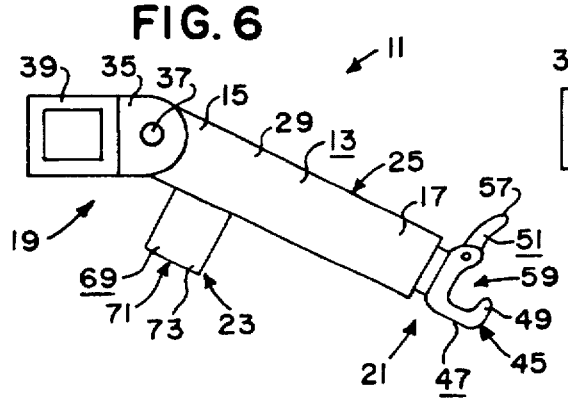
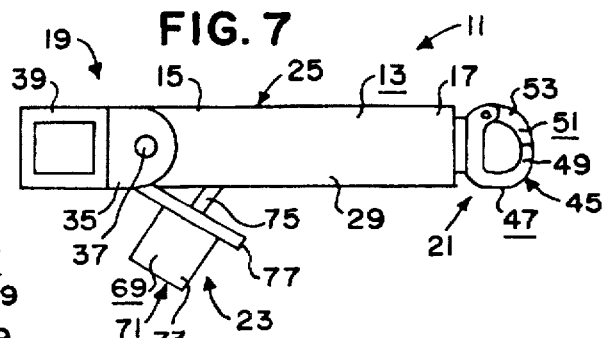
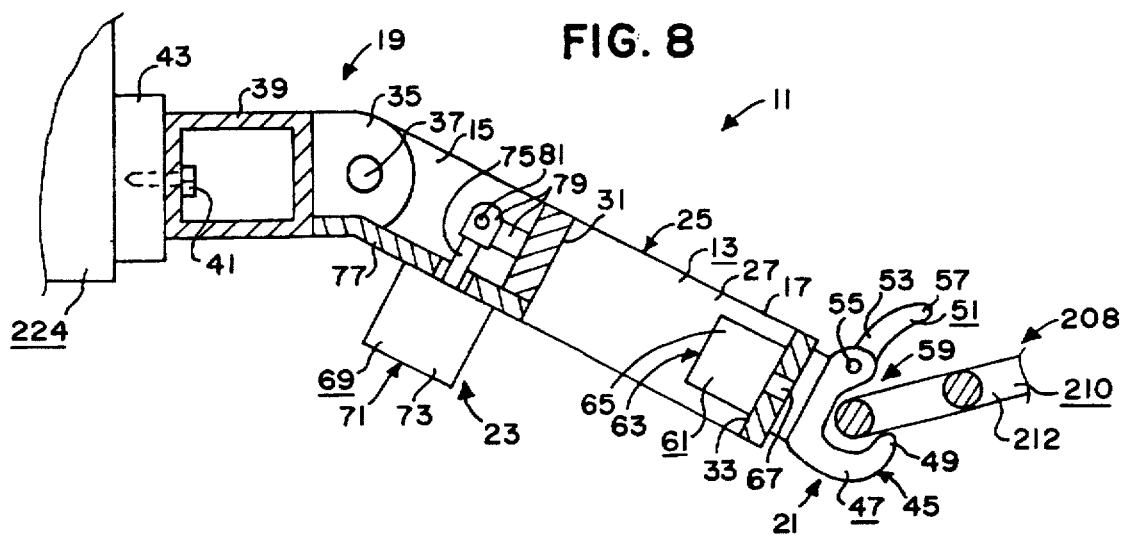
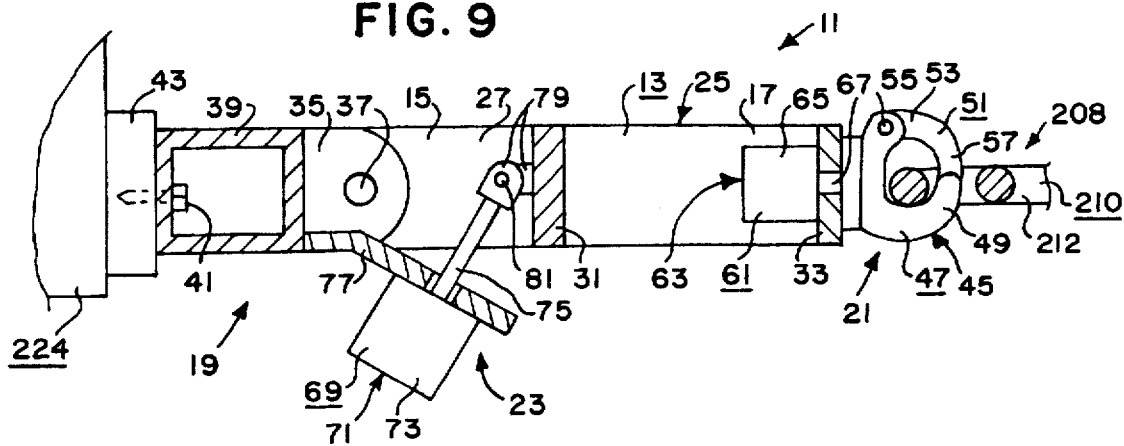

CONVERTER DOLLY LIFT MECHANISM

BACKGROUND OF THE INVENTION

1. Field of the Invention:

The present invention relates, in general, to a mechanism for lifting the front of converter dollies to allow the converter dollies to be easily moved.

2. Information Disclosure Statement:

A typical prior art tandem-type tractor-trailer rig is shown in FIG. 1 and identified by the numeral 200. The tractor-trailer rig 200 includes a tractor 202, a first or leading trailer 204, and a second or following trailer 206. A converter dolly 208 is used to couple the front of the second trailer 206 to the rear of the first trailer 204. The converter dolly 208 (see, in general, FIGS. 1–3) includes a body or frame 210 having a front end 212 and a rear end 214, a conventional fifth wheel connector 216 or the like on the frame 210 adjacent the rear end 214 thereof for pivotal connection to a conventional king pin, etc., (not shown) on the front end of the second trailer 206, a conventional lunette 218 or the like mounted to the frame 210 adjacent the front end 212 thereof for pivotal connection to a conventional pintle 220 attached to the rear end of the first trailer 204, and support wheels 222 mounted to the frame 210 typically by a single axle extending transverse to the frame 210 generally beneath the fifth wheel connector 216. A typical prior art truck-yard tractor 224 is shown in FIG. 2 in combination with a converter dolly 208. The truck-yard tractor 224 typically includes a conventional pintle 226 mounted on the front thereof for allowing the lunette 218 of the converter dolly 208 to be attached thereto so that the truck-yard tractor 224 can be used to move the converter dolly 208 around a truck-yard, etc. To position the lunette 218 of the converter dolly 208 on the pintle 226 of the truck-yard tractor 224, the front end 212 of the frame 210 must normally be moved from a lowered position on the ground as shown in solid lines in FIG. 2 to a raised position level with or slightly above the level of the pintle 226 as shown in broken lines in FIG. 2.

While some converter dollies have a hand crank type jack to raise and lower the front end of the frame thereof to the desired position, many are built so that they are balanced on a single axle as shown in FIGS. 1 and 2 so that one or more workers must manually reach down and pick up the front of the frame thereof to raise it to the desired position. Both methods are time consuming and create the possibility of serious bodily injury to the workers attempting to connect a converter dolly to a truck-yard tractor, etc. In a large truck yard, a single worker may be required to lift, move and connect several hundred convertor dollies over a typical work day.

A preliminary patentability search conducted in class 414, subclass 560 and class 280, subclass 402 produced the following patents which may be relevant to the present invention:

Dunlap, U.S. Pat. No. 4,152,006, issued May 1, 1979, discloses a secondary towing apparatus particularly suited for a towing vehicle having a conventional fifth wheel coupling device. The secondary towing apparatus includes a boom to be mounted on the chassis of the towing vehicle and moveable between a towing position in which a towed vehicle and be coupled thereto and a stowed position in which the conventional fifth wheel coupling device can be used, and brace member to secure the boom in a towing position.

Stage et al., U.S. Pat. No. 4,563,018, issued Jan. 7, 1986, discloses a towing device including an arm having a socket on a first end for attachment to a towed vehicle and having a mounting bracket on a second end for attachment to a tow vehicle. A hydraulic cylinder and associated support cylinders are positioned between the opposite ends of the arm for lifting the first end of the arm and one end of any towed vehicle attached thereto.

Boyles et al., U.S. Pat. No. 4,826,195, issued May 2, 1989, discloses an auxiliary towing apparatus for tractor trucks and the like. The auxiliary towing apparatus includes a transverse beam disposed between and pivotally connected to the rear ends of a pair of load-receiving frame members of the tractor truck. A ring-shaped hitch is adjustably mounted to the beam through various pistons, etc.

DeMichele et al., U.S. Pat. No. 5,013,209, issued May 7, 1991, discloses a towable dolly having a wheel lift mechanism for towing a vehicle by lifting the towed vehicle by its wheels so that contact with the towed vehicle's bumper, undercarriage or axle is avoided and so that the towed vehicle rides on its own suspension system.

Pocapalia, U.S. Pat. No. 5,139,102, issued Aug. 18, 1992, discloses a self-propelled trailer maneuvering dolly for transporting a fifth wheel trailer or a travel trailer. The dolly has a frame, a front handlebar and castor mechanism for steering, a pair of rear drive wheels for driving the dolly, a pneumatic motor, and sprocket wheels and chains for transmitting power to the drive wheels.

Nothing in the known prior art discloses or suggests the present invention. More specifically, nothing in the known prior art discloses or suggests a lift mechanism for use with a tractor and a convertor dolly, and including an elongated arm having a first end and a second end, tractor attachment means for pivotally attaching the first end of the arm to a tractor, convertor dolly attachment means for attaching the second end of the arm to a convertor dolly, and actuating means for raising the second end of the arm.

SUMMARY OF THE INVENTION

The present invention provides a lift mechanism for a truck-yard tractor or the like that allows the front end of a conventional converter dolly to be raised. A basic concept of the present invention is to provide a lift mechanism that allows the operator of a truck-yard tractor or the like to engage and lift the front end of a conventional converter dolly without leaving the cab of the truck-yard tractor.

The lift mechanism of the present invention is used in combination with a tractor and a convertor dolly, and includes an elongated arm having a first end and a second end; tractor attachment means for pivotally attaching the first end of the arm to a tractor; convertor dolly attachment means for attaching the second end of the arm to a convertor dolly; and actuating means for raising the second end of the arm.

One object of the present invention is to provide a lift mechanism that allows the operator of a truck-yard tractor or the like to engage and lift the front end of a conventional converter dolly without leaving the cab of the truck-yard tractor, thereby reducing the time required to lift and move such converter dollies and reducing the possibility of bodily injury to workers raising and moving such converter dollies.

Another object of the present invention is to provide such a lift mechanism that allows the operator to raise and lower the front end of the converter dolly using a hand valve with virtually no manual labor and a minimum amount of time.

Another object of the present invention is to provide such a lift mechanism that uses the hydraulic or pneumatic system of the truck-yard truck.

Another object of the present invention to provide such a lift mechanism that securely locks the converter dolly to the truck-yard tractor to keep the converter dolly securely affixed to the tractor as it is transported within the truck yard, etc.

BRIEF DESCRIPTION OF THE DRAWINGS

FIG. 1 is a side elevational view of a typical prior art tandem-type tractor-trailer rig.

FIG. 2 is a side elevational view of a typical prior art truck-yard tractor and a typical prior art dolly converter.

FIG. 3 is a top plan view of a portion of the front end of a typical prior art dolly converter.

FIG. 4 is a top plan view of the convertor dolly lift mechanism of the present invention.

FIG. 5 is a schematic of the pneumatic system of the convertor dolly lift mechanism of the present invention.

FIG. 6 is a side elevational view of the convertor dolly lift mechanism of the present invention shown in a lowered position.

FIG. 7 is a side elevational view of the convertor dolly lift mechanism of the present invention shown in a raised position.

FIG. 8 is a sectional view of the convertor dolly lift mechanism of the present invention shown in a lowered position and in combination with a portion of a truck-yard tractor and a portion of a dolly convertor.

FIG. 9 is a sectional view of the convertor dolly lift mechanism of the present invention shown in a raised position and in combination with a portion of a truck-yard tractor and a portion of a dolly convertor.

DESCRIPTION OF THE PREFERRED EMBODIMENT

A preferred embodiment of the converter dolly lift mechanism of the present invention is shown in FIGS. 4–9, and identified by the numeral 11. The converter dolly lift mechanism 11 is especially designed for attachment to a typical truck-yard tractor 224 shown in FIG. 2, and to a typical convertor dolly 208 shown in FIGS. 1–3.

The lift mechanism 11 includes an elongated arm 13 having a first end 15 and a second end 17; tractor attachment means 19 for pivotally attaching the first end 15 of the arm 13 to a tractor such as the truck-yard tractor 224; convertor dolly attachment means 21 for attaching the second end 17 of the arm 13 to a convertor dolly such as the convertor dolly 208; and actuating means 23 for raising the second end 17 of the arm 13.

The arm 13 may consist of a rigid A-frame structure 25 including a first elongated side beam 27, a second elongated side beam 29, a first cross beam 31 extending between the side beams 27, 29 adjacent the first end 15 of the arm 13, and a second cross beam 33 extending between the side beams 27, 29 at the second end 17 of the arm 13. The side beams 27, 29 may be a ⅜ inch by 4 inch metal plate approximately 23 ½ inches long. The first cross beam 31 may be a 4 inch metal channel member. The second cross beam 33 may be a ½ inch by 5 inch metal plate approximately 9 inches long. The ends of the various beams 27, 29, 31, 33 may be welded or otherwise fixedly secured together to form a rigid, strong A-frame structure with the side beams 27, 29 forming an angle of approximately 21° with respect to the longitudinal axis of the arm 13.

The tractor attachment means 19 preferably includes a plurality of ears 35 or the like for being fixedly attached to the tractor 224, and a plurality of pivot rods 37 for extending through the first end 15 of the arm 13 (i.e., through the first end of each side beam 27, 29) and through the ears 35 to thereby pivotally attach the arm 13 to the tractor 202 as will now be apparent to those skilled in the art. In addition, the tractor attachment means 19 preferably includes a support beam 39 for being fixedly attached by bolts 41 or the like to the front frame 43 of the tractor 224. The support beam 39 may be a 8 inch by 10 inch metal tube 41 inches long with bolt holes in such a configuration as to allow the tube to be bolted to the front frame 43 and/or bumper of the tractor 224. The ears 35 may be cut or otherwise machined from ⅜ inch by 4 inch metal plate and welded or otherwise fixedly attached to the support beam 39 in spaced pairs on opposite ends of the support beam 29.

The convertor dolly attachment means 21 preferably includes a pintle 45 having a locked position and an unlocked position. The pintle 45 preferably includes a main body 47 with a hook-like post or finger 49 for extending through the lunette 218 of the convertor dolly 208. The pintle 45 also preferably includes a head 51 pivotally associated with the body 47 for movement between a open or unlocked position as shown in FIGS. 6 and 8 and a closed or locked position as shown in FIGS. 7 and 9. Thus, the head 51 may have a first end 53 for being pivotally attached to the body 47 by way of a pivot rod 55, and a second end 57 for engaging or being positioned adjacent the distal end of the finger 49 of the body 47 when in the closed or locked position as shown in FIGS. 7 and 9 and for being positioned away from the distal end of the finger 49 when in the opened or unlocked position as shown in FIGS. 6 and 8 so that a gap 59 is formed between the second end 57 of the head 51 and the distal end of the finger 49 to allow the lunette 218 to pass therethrough.

The convertor dolly attachment means 21 further preferably includes pintle piston means 61 for moving the pintle 45 between the locked and unlocked positions. The pintle piston means 61 preferably consist of a pneumatic piston 63 operative coupled between the head 51 of the pintle 45 and the second cross beam 33 of the A-frame structure 25 as diagrammatically shown in FIGS. 8 and 9 so as to selectively move the head 51 between the opened and closed positions as will now be apparent to those skilled in the art. For example, the pneumatic piston 63 may include a piston cylinder 65 fixedly attached to the second cross beam 33, and a piston rod 67 attached to the head 51 of the pintle 45 in such a manner so that the head 51 will moved to the closed position when the piston rod 67 is extended from the piston cylinder 65 as will now be apparent to those skilled in the art.

The pintle 45 and pintle piston means 61 preferably consist of a standard, off-the-shelf pintle hook and lock assembly such as manufactured or sold by Holland Hitch Co., 430 West 18th Street, Holland, Mich. 49423, or the like, as will now be apparent to those skilled in the art.

The actuating means 23 preferably includes an actuating means piston means 69 for extending between the tractor 224 or the tractor attachment means 19 and the arm 13 for raising the second end of the arm 13. The actuating means piston means 69 preferably consist of a pneumatic piston 71 operative coupled between the first cross beam 31 of the A-frame structure 25 and the support beam 39 as diagrammatically shown in FIGS. 8 and 9 so as to selectively the second end 17 of the arm 13 as will now be apparent to those skilled in the art. For example, the pneumatic piston 71 may include a piston cylinder 73 fixedly attached relative to the support beam 39 of the tractor attachment means 19 (and thus to the tractor 224), and a piston rod 67 attached to the first cross beam 31 in such a manner so that the second end 17 of the arm 51 will be moved to the raised position when the piston rod 75 is extended from the piston cylinder 73 as shown in FIG. 9 and as will now be apparent to those skilled in the art. A plate 77 is preferably attached to the support beam 39 to allow the piston cylinder 73 to be fixedly attached relative to the support beam 39 as clearly shown in FIGS. 8 and 9. The plate 77 may be a ½ inch metal plate approximately 12 ½ inches long and 8 inches wide, attached to the bottom center of the support beam 39 by welding or the like, and extending forwardly therefrom. The plate 77 may have a plurality of slots therein approximately ⅝ inches wide and 3 inches long for allowing the piston cylinder 73 to be adjustably mounted thereof. The piston rod 75 may be coupled to the first cross beam 39 by way of one or more ears 79 fixedly attached to the first cross beam 39 and a pivot rod 81 extending through the distal end of the piston rod 75 and the ears 79.

The actuating means piston means 69 preferably consist of a standard, off-the-shelf pneumatic piston such as the air brake cylinder, model Anchor LOK 6152305 manufactured or sold by Neway Anchor LOK International, 1950 Industrial Boulevard, Muskegon, Mich. 49443, or the like, as will now be apparent to those skilled in the art.

The pneumatic system for allowing the operator of the tractor 224 to control the lift mechanism 11 is shown schematically in FIG. 5. The pneumatic system preferably includes a pressurized air source 83 such as a pressurized air tank, or an air pump, etc.; a pintle piston valve 85 for controlling the flow of pressurized air to the pintle piston means 61; an actuating means piston valve 87 for controlling the flow of pressurized air to the actuating means piston means 69; and various pneumatic lines or hoses for connecting the various parts. The pintle piston valve 85 preferably consist of a standard, off-the-shelf push and pull valve such as model APR95K manufactured or sold by Midland TM, 10930 Pomona Avenue, Kansas City, Mo. 64153, or the like, as will now be apparent to those skilled in the art. The actuating means piston valve 87 preferably consist of a standard, off-the-shelf hand valve such as part T2398897 manufactured or sold by Bendix, 101 Columbia Road, Morris Town, N.J. or the like, as will now be apparent to those skilled in the art.

While the preferred embodiment of the lift mechanism 11 has been described in conjunction with a pneumatic system, it will be understood by those skilled in the art that the various piston means could also be controlled by hydraulic, mechanical, or electrical force, etc.

The method of using the lift mechanism 11 starts with attaching the support beam 39 to the tractor 224 and connecting the valves 85, 87 and pistons 63, 71 to the pressurized air source 83 or the like by way of standard air line hoses or the like. Next, the operator of the tractor 224 can drive the tractor 224 to a convertor dolly 208 that is to be moved. Then, with the arm 13 in the lowered position, the operator can position the tractor 224 so that the finger 49 of the pintle 45 is positioned beneath the aperture through the lunette 218 of the convertor dolly 208. Next, by merely opening the valve 87, the second end 17 of the arm 13 will move to the raised position, thereby raising the convertor dolly 208. The operator can then open the valve 85 to move the pintle 45 to the locked position. The convertor dolly 208 can then be easily and safely transported by the tractor 224 to any desired location such as to the front end of a second or following trailer 206 so that the fifth wheel connector 216 of the convertor dolly 208 can be connected to the king pin of the following trailer 206, etc. Once the convertor dolly 208 has been transported to the desired location, the operator can close the valve 85, causing the pintle 45 to move to the unlocked position, and can then close the valve 87, causing the second end 17 of the arm 13 to move to the lowered position, so that the tractor 224 can be driven away from the convertor dolly 208. The lunette 218 of the convertor dolly 208 can then be attached to the pintle 220 of a first or leading trailer 204 in the conventional manner to thereby form a tandem-type tractor-trailer rig as will now be apparent to those skilled in the art.

As thus manufactured and used, the present invention provides a lift mechanism that can be bolted or otherwise attached to the frame, front bumper, etc., of a typical truck-yard tractor or the like for allowing a single worker or operator to drive the tractor to a typically convertor dolly, and, without leaving the tractor, lock onto and lift the convertor dolly by merely closing two valves, and the transport the convertor dolly to a desired location.

Although the present invention has been described and illustrated with respect to a preferred embodiment and a preferred use therefor, it is not to be so limited since modifications and changes can be made therein which are within the full intended scope of the invention.

We claim:

1. In combination:

(a) a tractor;
   (b) a convertor dolly; and
   (c) a lift mechanism comprising:
      (i) an elongated arm having a first end and a second end; said arm including a first elongated side beam, a second elongated side beam, and a cross beam extending between said first and second side beams with said beams joined together to form a rigid A-frame structure;
      (ii) tractor attachment means pivotally attaching said first end of said arm to said tractor; said tractor attachment means including a support beam fixedly attached to said tractor, including a plurality of ears attached to said support beam, and including a pivot rod pivotally attaching said first end of said arm to said ears;
      (iii) convertor dolly attachment means attaching said second end of said arm to said convertor dolly; said convertor dolly attachment means including a pintle having a locked position and an unlocked position and including pintle piston means for moving said pintle between said locked and unlocked positions;
      (iv) actuating means for raising said second end of said arm; said actuating means including an actuating means piston means extending between said tractor attachment means and said arm for raising said second end of said arm; and
      (v) a pneumatic system for activating said pintle piston means and said actuating means piston means; said pneumatic system including a pressurized air source, a pintle piston valve for controlling the flow of pressurized air from said pressurized air source to said pintle piston means, and a actuating means piston valve for controlling the flow of pressurized air from said pressurized air source to said actuating means piston means.

* * * * *